(12) United States Patent
Panas

(10) Patent No.: US 12,066,515 B2
(45) Date of Patent: Aug. 20, 2024

(54) MULTI-BODY COHERENT APERTURE SYNTHESIS

(71) Applicant: Lawrence Livermore National Security, LLC, Livermore, CA (US)

(72) Inventor: Robert M. Panas, Livermore, CA (US)

(73) Assignee: LAWRENCE LIVERMORE NATIONAL SECURITY, LLC, Livermore, CA (US)

( * ) Notice: Subject to any disclaimer, the term of this patent is extended or adjusted under 35 U.S.C. 154(b) by 560 days.

(21) Appl. No.: 17/403,130

(22) Filed: Aug. 16, 2021

(65) Prior Publication Data

US 2023/0047410 A1    Feb. 16, 2023

(51) Int. Cl.
*G01S 13/08* (2006.01)
*G01S 17/08* (2006.01)
*H01Q 1/22* (2006.01)

(52) U.S. Cl.
CPC .............. *G01S 13/08* (2013.01); *G01S 17/08* (2013.01); *H01Q 1/225* (2013.01)

(58) Field of Classification Search
CPC .......... G01S 13/08; G01S 17/08; G01S 17/48; G01S 17/88; H01Q 1/225
See application file for complete search history.

(56) References Cited

U.S. PATENT DOCUMENTS

| | | | | |
|---|---|---|---|---|
| 8,234,067 | B2* | 7/2012 | Bauer | G01C 21/005 |
| | | | | 701/467 |
| 8,559,017 | B2* | 10/2013 | Schulz | G02B 7/183 |
| | | | | 356/618 |
| 9,104,201 | B1* | 8/2015 | Pillai | H04L 67/12 |
| 10,107,891 | B1* | 10/2018 | Ngo | G01S 5/0278 |
| 10,412,545 | B1* | 9/2019 | Liu | H04W 76/14 |
| 10,700,779 | B1* | 6/2020 | Panas | H04B 10/66 |
| 10,935,635 | B2* | 3/2021 | Beer | B64C 39/024 |
| 2016/0306043 | A1* | 10/2016 | Moss | G01S 7/4817 |
| 2018/0156900 | A1* | 6/2018 | Shintani | G01S 17/87 |
| 2018/0167452 | A1* | 6/2018 | Yucelen | H04W 4/46 |
| 2019/0154439 | A1* | 5/2019 | Binder | G01B 11/026 |
| 2020/0025880 | A1* | 1/2020 | Pacala | H05K 1/0274 |
| 2023/0023701 | A1* | 1/2023 | Shah | H04L 67/12 |

* cited by examiner

*Primary Examiner* — Peter M Bythrow
(74) *Attorney, Agent, or Firm* — Perkins Coie LLP

(57) ABSTRACT

An antenna is provided with sub-apertures whose relative locations change and that are not connected via a mechanical link. a Multi-Body Coherent Aperture Synthesis system supports an antenna with sub-aperture devices that collect views, collect (using an optical link) ranging information (that includes timing information) relating to distance between sub-aperture devices, and transmit the collected views and ranging information to a master device. The master device synthesizes the collected views into a synthesized image based on the ranging information.

20 Claims, 4 Drawing Sheets

MULTI-BODY COHERENT APERTURE SYNTHESIS

STATEMENT REGARDING FEDERALLY SPONSORED RESEARCH

The United States government has rights in this invention pursuant to Contract No. DE-AC52-07NA27344 between the U.S. Department of Energy and Lawrence Livermore National Security, LLC, for the operation of Lawrence Livermore National Laboratory.

BACKGROUND

The performance of an antenna is correlated to the size of its aperture. In general, a larger aperture results in an improved ability to focus the emitted beam or an increase in the scale of a collected view. Many antennas comprise a constellation of sub-apertures whose collected views are combined into a synthesized image. Such antennas include the Very Large Array (VLA) with 25 radio frequency (RF) sub-apertures and the Atacama Large Millimeter Array (ALMA) with 66 RF sub-apertures.

These antennas have sub-apertures with a known spatial structure and can be controlled to a fraction of a wavelength. For example, such antennas are designed with tolerances well below the wavelength of the electromagnetic (EM) waves they are intended to collect (referred to as "collected views") to ensure proper focus. In general, to effectively combine the collected views, the antenna needs to (1) know the spatial structure of the sub-apertures to a small fraction of the captured wavelength, (2) synchronize the time of collection of the collected views to a small fraction of the captured wavelength period, and (3) receive the collected views at a single location.

In other words, a constellation of sub-apertures should be tied together into a single synchronized Spatial/Temporal Coordinate Frame (STCF) with communications links. When the system lacks a synchronized STCF and position or time drifts, the sub-apertures lose coherence with one another. As a result, the synthesized image (created by the synchronization of collected views of many sub-apertures) rapidly degrades.

Antennas such as the VLA and ALMA have a known spatial structure (although the sub-apertures may be moved from time to time) so that the locations and time of flight of communications are known in advance of any collection of views. In addition, the sub-apertures send their collected views via a physical communication link such as fiber optic cables. The weight, lack of maneuverability, complexity, and cost of such antennas make their use, albeit very important, limited.

For some applications (e.g., a space-based antenna), it may be desirable for the antenna to have sub-apertures that are not in a fixed location (e.g., they can move around or drift relative to each other) and do not have a mechanical connection or link. In such a case, it can be a challenge to determine the current STCF and to transmit collected views to a central location for combining into a synthesized image that is coherent.

DETAILED DESCRIPTION

Figure 1:
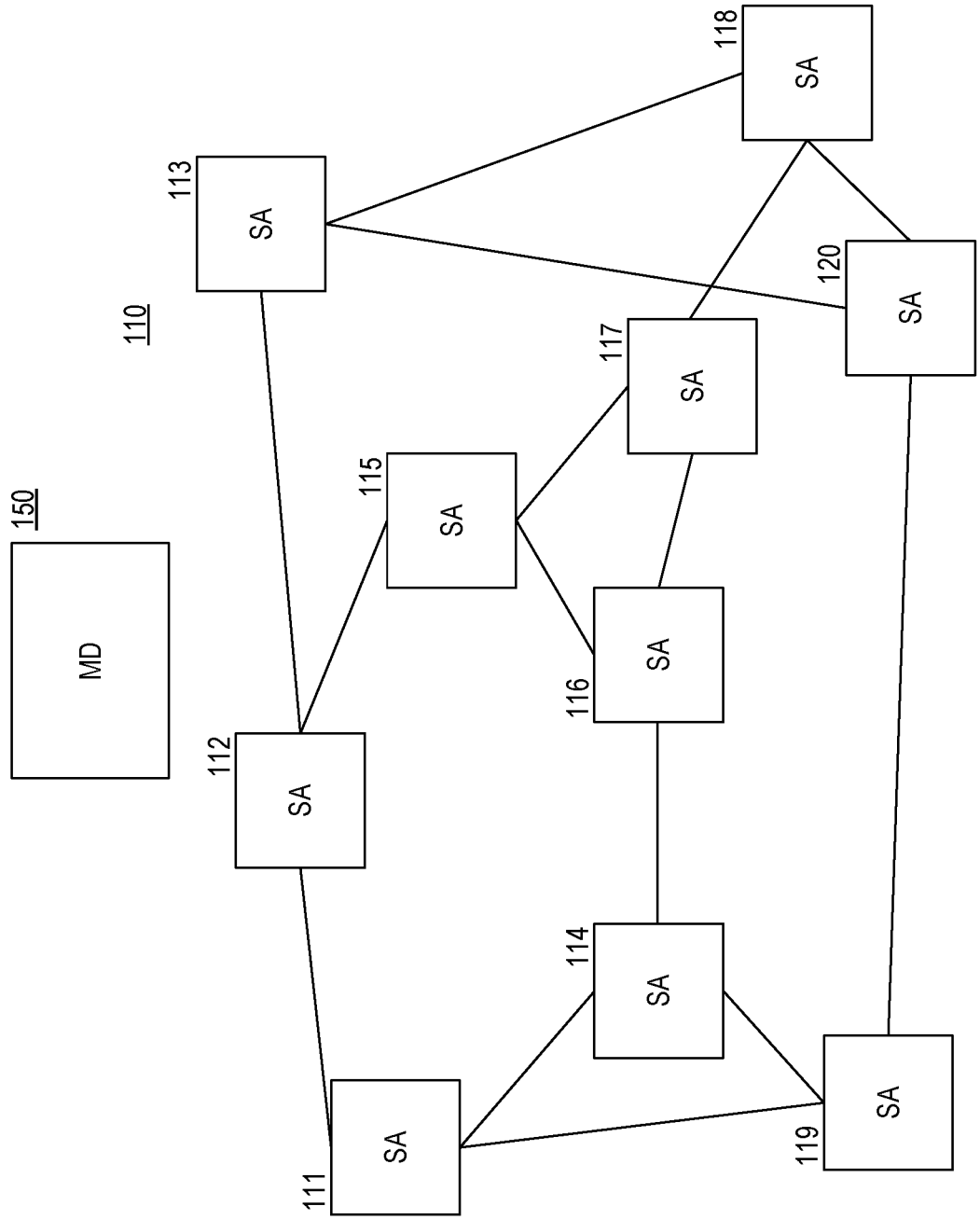
FIG. 1 is a block diagram that illustrates the configuration of an antenna that includes a constellation of sub-aperture devices.

Methods and systems are provided for an antenna comprising sub-apertures whose relative locations change and that are not connected via a mechanical link. In some embodiments, a Multi-Body Coherent Aperture Synthesis (MBCAS) system supports an antenna with sub-aperture devices that collect views, collect (using an optical link) ranging information (that includes timing information) relating to distance between sub-aperture devices, and transmit the collected views and ranging information to a master device. The master device synthesizes the collected views into a synthesized image based on the ranging information.

In some embodiments, a sub-aperture device includes a sub-aperture with a receiver, a ranging component, and a communications component. The ranging component collects ranging information between sub-aperture devices to support determining the distances between sub-aperture devices. The ranging component includes an optical link subcomponent, an optical steering subcomponent, and a distance measuring subcomponent.

The optical link subcomponent includes a laser emitter, an optical detector, and a beamsteering element, preferably a mirror array. The optical link subcomponent transmits signals to and receives signals from other sub-aperture devices to support determining the distance between sub-aperture devices. In some embodiments, a ranging component may have multiple optical link subcomponents to support being linked to multiple sub-aperture devices simultaneously.

The optical steering subcomponent interfaces with the optical link subcomponent to steer a ranging signal toward another sub-aperture device so that the other sub-aperture device can acquire the ranging signal. The optical steering subcomponent also employs the optical link subcomponent to acquire a ranging signal sent by another sub-aperture device. The optical link subcomponent and the optical steering subcomponent may employ technology described in U.S. Pat. No. 10,700,779, entitled "System and Method for Compact Adaptive Free Space Optical Communications," which is hereby incorporated by reference.

In the preferred mode of measuring distance, the distance measuring subcomponent receives timing information relating to a send time when the other sub-aperture device sent a ranging signal so that the distance between the sub-aperture devices can be determined based on the send timing information and based on receive timing information derived from when the sub-aperture device received the ranging signal. The send timing information may be encoded in the ranging signal so that the other sub-aperture device knows when the ranging signal was transmitted. The distance measuring subcomponent also sends to the other sub-aperture device a ranging signal that specifies send timing information so that the distance between the sub-aperture device and the other sub-aperture device can be determined based on the send timing information and based on receive timing information derived from when the other sub-aperture device received the ranging signal.

The communications component sends ranging information and collected views to a master device.

The master device may synthesize the collected views into a synthesized image based on the ranging information that includes the timing information. The master device may be co-located with a sub-aperture device or may be located independent of any sub-aperture device. The master device may include a communications component for communicating with the sub-aperture devices to receive ranging information and to receive the collected views. The master device may also include an image synthesize component to synthesize the collected views based on the ranging information into a synthesized image that is coherent. The sub-aperture devices and the master device may communicate with each other using a channel other than the optical link, such as an RF channel. For example, each sub-aperture device may send its ranging information to the master device via an RF channel. Rather than generate the synthesized image, the master device may transmit the collected views and ranging information to another device for synthesis.

In some embodiments, an antenna may be space-based with sub-aperture devices that have navigation components to move the sub-aperture devices independently. For example, if a particular arrangement of the sub-aperture devices is desired to collect signals, the navigation components can be directed to position the sub-aperture devices in that arrangement. (See U.S. Pat. No. 10,935,635, entitled "Object Discrimination Based on a Swarm of Agents," which is hereby incorporated by reference.) Because the actual location of the sub-aperture devices may not be precisely known and the sub-aperture devices may drift, the ranging component is used to assist in determining the actual location to the needed precision. The sub-aperture devices may be space-based, such as on small satellites; land-based, such as on unmanned ground vehicles (UGVs); aerial-based, such as on unmanned aerial vehicles (UAVs); and/or water-based, such as on unmanned underwater vehicle (UUVs). The sub-aperture devices may also be on manned vehicles.

In some embodiments, the MBCAS system may employ triangulation to determine the location of the sub-aperture devices based on the ranging information. To support triangulation, each sub-aperture device may establish a ranging link with at least three other sub-aperture devices. In addition, the master device may be optically linked to at least three sub-aperture devices. The optical links to the master device allow the master device to determine the location of the sub-aperture devices relative to the location of the master device. In addition, the optical link component may support identifying the orientation of the sub-aperture devices, which may be useful when generating a synthesized image.

In some embodiments, each sub-aperture device may include a clock, such as an atomic clock. However, any clock will necessarily drift over time, resulting in the clock's being out of synchronization. The sub-aperture devices may periodically receive synchronization signals (for example, from the master device) and synchronize their clocks. Alternatively, a sub-aperture device may send a synchronization signal via the optical link to other sub-aperture devices, each of which in turn forwards the synchronization signal with its own send time to other sub-aperture devices. Each sub-aperture device uses the send time encoded in the synchronization signal to synchronize its clock.

In some situations, the master device may not be able to receive signals from each sub-aperture device. For example, sub-aperture devices that are UGVs may be blocked by a physical structure from communicating with the master device or may be out of range from the master device. To support communicating with the master device in such situations, the sub-aperture devices may forward collected views and ranging information to other sub-aperture devices, which in turn forward the collected views and ranging information to other sub-aperture devices. In such a case, a sub-aperture device in communication with the master device can then forward a collected view and ranging information to the master device. The sub-aperture devices thus act as a communication "hop" along a path to the master device.

In some embodiments, the MBCAS system may be employed to direct energy collected via a solar panel to a land-based receiver to support, for example, generation of electrical power. Each sub-aperture device may also include a transmitter to transmit energy as a coherent beam to the land-based receiver. The ranging information collected by the ranging component can be used to steer the energy into the coherent beam and to direct the beam to the receiver, whether the receiver is space-based or land-based.

The MBCAS system may be used in a variety of applications. The antenna with sub-aperture devices may function as a radio telescope, as a transmitter/receiver for ground-penetrating radar, to search for underwater objects, to track vehicles (e.g., land-based), to track space junk, to collect and transmit energy, and so on.

FIG. 1 is a block diagram that illustrates the configuration of an antenna that includes a constellation of sub-aperture devices. A constellation 110 of sub-aperture (SA) devices includes sub-apertures 111-120. Each sub-aperture device has an optical link established to three other sub-aperture devices. For example, sub-aperture device 111 has an optical link to sub-aperture devices 112, 114, and 119. Although not illustrated, each sub-aperture device has a communications channel with a master device 150.

Figure 2:
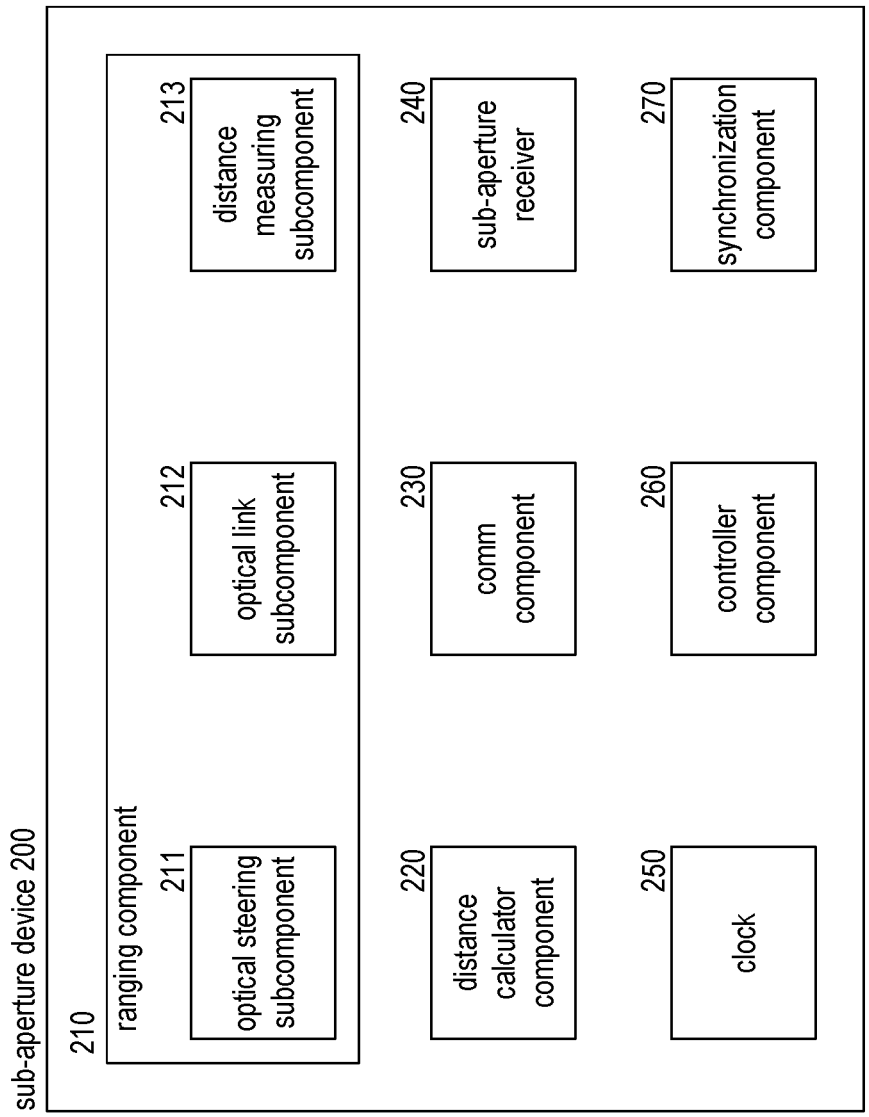
FIG. 2 is a block diagram that illustrates components of a sub-aperture device in some embodiments.

FIG. 2 is a block diagram that illustrates components of a sub-aperture device in some embodiments. A sub-aperture device 200 includes a ranging component 210, a distance calculator component 220, a communications component 230, a sub-aperture receiver 240, a clock 250, a controller component 260, and a synchronization component 270. The ranging component includes an optical steering subcomponent 211, an optical link subcomponent 212, and a distance measuring subcomponent 213. The optical steering subcomponent controls the steering of the optical link so that a signal between sub-aperture devices can be acquired. The distance measuring subcomponent collects ranging information based on timing information derived from a send time and receive times of an optical signal sent along the optical link. The distance calculator component may calculate the distance between sub-aperture devices based on the timing information and the modulation of a waveform passed between the transmitter and receiver. Alternatively, the timing information can be uploaded to the master device to determine the distances. The communications component provides a communications channel, such as an RF channel, that may be used to transmit and receive information between the sub-aperture devices and the master device. The communications component can also be another mode of the optical link used for ranging. The sub-aperture receiver collects the view used in generating the synchronized image. The clock is used to establish transmit and receive times. The synchronization component of a sub-aperture devices maintains synchronization of its clock based on synchronization signals received from other sub-aperture devices or a master device. The controller component controls the overall operation of the sub-aperture device. The sub-aperture devices may also include a global positioning (GPS) component, for example, to position a sub-aperture device at a desired location.

Figure 3:
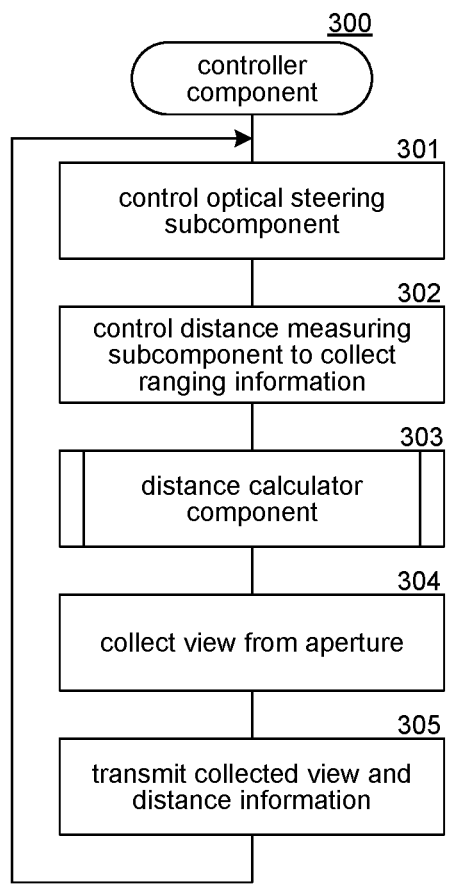
FIG. 3 is a flow diagram that illustrates operation of the controller component in some embodiments.

FIG. 3 is a flow diagram that illustrates operation of the controller component in some embodiments. The controller component 300 controls the overall operation of the sub-aperture device. In block 301, the controller component directs the optical steering subcomponent to establish an optical link with a sub-aperture device. In block 302, the controller component directs the distance measuring subcomponent to collect ranging information. The controller component may direct the processing of blocks 301 and 302 to be repeated to collect ranging information from multiple sub-aperture devices. In block 303, the controller component directs the distance calculator component to calculate the distance to the sub-aperture device based on the ranging information. In block 304, the controller component collects the view from the sub-aperture. The collecting of the views and the ranging may also be performed in parallel. In block 305, the controller component transmits the distance information and the collected view to the master device. The component then loops to block 301 to repeat the processing.

Figure 4:
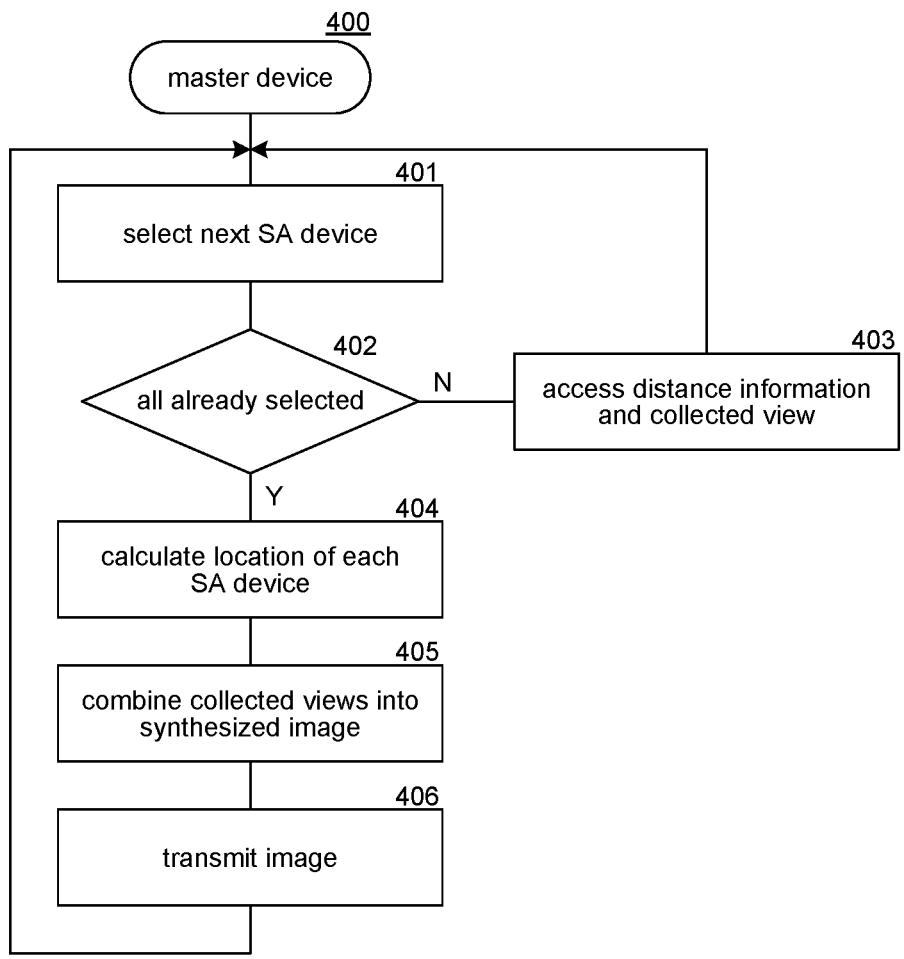
FIG. 4 is a flow diagram that illustrates the operation of the master device in some embodiments.

FIG. 4 is a flow diagram that illustrates the operation of the master device in some embodiments. The master device 400 generates a synthesized image into a coherent image based on the collected views and the distance information. In block 401, the master device selects a sub-aperture device. In decision block 402, if all the sub-aperture devices have been selected, then the master device continues at block 404, else the master device continues at block 403. In block 403, the master device accesses the distance information and collected view of the selected sub-aperture device that is to be combined into an image and loops to block 401 to select the next sub-aperture device. In block 404, the master device calculates the location of each sub-aperture device based on the distance information. In block 405, the master device combines the collected views into a synthesized image that is coherent. In block 406, the master device transmits the image, for example, to a ground-based receiver. The collected views and distance information may alternatively be transmitted to the ground-based receiver to synthesize the image. The master device then loops to block 401 to repeat the processing.

The computing systems on which aspects of the MBCAS system may be implemented may include a central processing unit, input devices, output devices (e.g., display devices and speakers), storage devices (e.g., memory and disk drives), network interfaces, graphics processing units, cellular radio link interfaces, global positioning system devices, and so on. The input devices may include keyboards, pointing devices, touch screens, gesture recognition devices (e.g., for air gestures), head and eye tracking devices, microphones for voice recognition, and so on. The computing systems may include desktop computers, laptops, tablets, e-readers, personal digital assistants, smartphones, gaming devices, servers, and so on. The computing systems may access computer-readable media that include computer-readable storage media (or mediums) and data transmission media. The computer-readable storage media are tangible storage means that do not include a transitory, propagating signal. Examples of computer-readable storage media include memory such as primary memory, cache memory, and secondary memory (e.g., DVD) and other storage. The computer-readable storage media may have recorded on it or may be encoded with computer-executable instructions or logic that implements the MBCAS system. The data transmission media is used for transmitting data via transitory, propagating signals or carrier waves (e.g., electromagnetism) via a wired or wireless connection. The computing systems may include a secure cryptoprocessor as part of a central processing unit for generating and securely storing keys and for encrypting and decrypting data using the keys. The computing systems may be servers that are housed in a data center such as a cloud-based data center.

The MBCAS system may be described in the general context of computer-executable instructions, such as program modules and components, executed by one or more computers, processors, or other devices. Generally, program modules or components include routines, programs, objects, data structures, and so on that perform particular tasks or implement particular data types. Typically, the functionality of the program modules may be combined or distributed as desired in various embodiments. Aspects of the MBCAS system may be implemented in hardware using, for example, an application-specific integrated circuit (ASIC) or field programmable gate array (FPGA).

The following paragraphs describe various embodiments of aspects of the MBCAS system. An implementation of the MBCAS system may employ any combination of the embodiments. The processing described below may be performed by a computing device with a processor that executes computer-executable instructions stored on a computer-readable storage medium that implements the MBCAS system.

In some embodiments, a ranging component for a sub-aperture device that includes a sub-aperture of an antenna with a plurality of sub-apertures is provided. The ranging component includes an optical link subcomponent, an optical steering subcomponent, and a distance measuring subcomponent. The optical link subcomponent includes a laser emitter, an optical detector, and a beamsteering element. The optical steering subcomponent interfaces with the optical link subcomponent to acquire a signal sent from another sub-aperture device and to send a signal so that the other sub-aperture device can acquire a signal sent via the optical link subcomponent. The distance measuring subcomponent receives send timing information relating to a send time when the other sub-aperture device sent a ranging signal so that the distance between the sub-aperture device and the other sub-aperture device can be determined based on the send timing information and based on receive timing information derived from when the sub-aperture device received the ranging signal. In some embodiments, the ranging component further includes a communications subcomponent that sends to a master device ranging information derived from the receive timing information so that the master device can determine the distance between the sub-aperture device and the other sub-aperture device based on the send timing information and the receive timing information. In some embodiments, the master device receives ranging information from the other sub-aperture device derived from the send timing information. In some embodiments, the master device receives ranging information from the sub-aperture device derived from the send timing information. In some embodiments, the communications subcomponent sends the ranging information via the optical link subcomponent. In some embodiments, the communications subcomponent sends the ranging information via an omni-directional antenna. In some embodiments, the communications subcomponent sends the ranging information via a radio frequency electromagnetic wave. In some embodiments, 8 the optical steering subcomponent acquires signals sent from at least three other sub-aperture devices and sends signals to at least three other sub-aperture devices so that the relative positions of sub-aperture devices can be determined using triangulation. In some embodiments, the ranging component includes multiple optical link subcomponents that acquire signals received from other sub-aperture devices. In some embodiments, the ranging component further includes an orientation subcomponent that collects directional information relating to the optical link subcomponent so that the orientation of the sub-aperture device can be determined. In some embodiments, the sub-aperture device has no physical connection to an external device. In some embodiments, the ranging component further includes a clock synchronization component to control synchronization of a clock of the sub-aperture device. In some embodiments, the distance measuring subcomponent further sends to the other sub-aperture device a ranging signal that encodes send timing information so that the distance between the sub-aperture device and the other sub-aperture device can be determined.

In some embodiments, an antenna is provided that includes a plurality of sub-aperture devices and a master device. A sub-aperture device includes a sub-aperture with a receiver to collect views, a ranging component, and a communications component, the ranging component including an optical link subcomponent, an optical steering subcomponent, and a distance measuring subcomponent, the communications component for communicating with the master device. The master device includes a communications component for communicating with the sub-aperture devices to receive ranging information generated by the ranging components and to receive views collected by the receivers and an image synthesize component to synthesize the received views based on the ranging information into a synthesized image that is coherent. In some embodiments, the optical steering subcomponent of a sub-aperture device interfaces with the optical link subcomponent of that sub-aperture device to direct a ranging signal with send timing information at another sub-aperture device so that the other sub-aperture device can acquire the ranging signal and to acquire a ranging signal with send timing information directed to that sub-aperture device by another sub-aperture device. In some embodiments, the sub-aperture devices are adapted to change locations. In some embodiments, the sub-aperture devices are not physically coupled to another. In some embodiments, the sub-aperture devices are space-based. In some embodiments, the sub-apertures include an electromagnetic energy receiver that receives electromagnetic energy from a solar panel array and an electromagnetic transmitter that transmits the electromagnetic energy wherein the transmitted electromagnetic energy of the sub-aperture devices is transmitted as a beam to a target. In some embodiments, the master device is a mothership from which the sub-aperture devices are launched.

Although the subject matter has been described in language specific to structural features and/or acts, it is to be understood that the subject matter defined in the appended claims is not necessarily limited to the specific features or acts described above. Rather, the specific features and acts described above are disclosed as example forms of implementing the claims. Accordingly, the invention is not limited except as by the appended claims.

I claim:

1. A ranging component for a sub-aperture device that includes a sub-aperture of an antenna with a plurality of sub-apertures, the ranging component comprising:
    an optical link subcomponent that includes a laser emitter, an optical detector, and a beamsteering element;
    an optical steering subcomponent that interfaces with the optical link subcomponent to acquire a signal sent from another sub-aperture device and to send a signal so that the other sub-aperture device can acquire a signal sent via the optical link subcomponent; and
    a distance measuring subcomponent that receives send timing information relating to a send time when the other sub-aperture device sent a ranging signal so that the distance between the sub-aperture device and the other sub-aperture device can be determined based on the send timing information and based on receive timing information derived from when the sub-aperture device received the ranging signal.

2. The ranging component of claim 1 further comprising: a communications subcomponent that sends to a master device ranging information derived from the receive timing information so that the master device can determine the distance between the sub-aperture device and the other sub-aperture device based on the send timing information and the receive timing information.

3. The ranging component of claim 2 wherein the master device receives ranging information from the other sub-aperture device derived from the send timing information.

4. The ranging component of claim 2 wherein the master device receives ranging information from the sub-aperture device derived from the send timing information.

5. The ranging component of claim 2 wherein the communications subcomponent sends the ranging information via the optical link subcomponent.

6. The ranging component of claim 2 wherein the communications subcomponent sends the ranging information via an omni-directional antenna.

7. The ranging component of claim 2 wherein the communications subcomponent sends the ranging information via a radio frequency electromagnetic wave.

8. The ranging component of claim 1 wherein the optical steering subcomponent acquires signals sent from at least three other sub-aperture devices and sends signals to at least three other sub-aperture devices so that the relative positions of sub-aperture devices can be determined using triangulation.

9. The ranging component of claim 8 wherein the ranging component includes multiple optical link subcomponents that acquire signals received from other sub-aperture devices.

10. The ranging component of claim 8 further comprising an orientation subcomponent that collects directional information relating to the optical link subcomponent so that the orientation of the sub-aperture device can be determined.

11. The ranging component of claim 1 wherein the sub-aperture device has no physical connection to an external device.

12. The ranging component of claim 1 further comprising a clock synchronization component to control synchronization of a clock of the sub-aperture device.

13. The ranging component of claim 1 wherein the distance measuring subcomponent further sends to the other sub-aperture device a ranging signal that encodes send timing information so that the distance between the sub-aperture device and the other sub-aperture device can be determined.

14. An antenna comprising:
    a plurality of sub-aperture devices; and
    a master device
    wherein a sub-aperture device includes a sub-aperture with a receiver to collect views, a ranging component, and a communications component, the ranging component including an optical link subcomponent, an optical steering subcomponent, and a distance measuring subcomponent, the communications component for communicating with the master device;
wherein the master device includes
   a communications component for communicating with the sub-aperture devices to receive ranging information generated by the ranging components and to receive views collected by the receivers; and
   an image synthesize component to synthesize the received views based on the ranging information into a synthesized image that is coherent.

15. The antenna of claim 14 wherein the optical steering subcomponent of a sub-aperture device interfaces with the optical link subcomponent of that sub-aperture device to direct a ranging signal with send timing information at another sub-aperture device so that the other sub-aperture device can acquire the ranging signal and to acquire a ranging signal with send timing information directed to that sub-aperture device by another sub-aperture device.

16. The antenna of claim 14 wherein the sub-aperture devices are adapted to change locations.

17. The antenna of claim 14 wherein the sub-aperture devices are not physically coupled to another.

18. The antenna of claim 14 wherein the sub-aperture devices are space-based.

19. The antenna of claim 14 wherein the sub-apertures include an electromagnetic energy receiver that receives electromagnetic energy from a solar panel array and an electromagnetic transmitter that transmits the electromagnetic energy wherein the transmitted electromagnetic energy of the sub-aperture devices is transmitted as a beam to a target.

20. The antenna of claim 14 wherein the master device is a mothership from which the sub-aperture devices are launched.

\* \* \* \* \*